United States Patent [19]

Wolf

[11] 3,990,691

[45] Nov. 9, 1976

[54] FRAME FOR THE MANUFACTURE OF COMPOSITE WOODEN ELEMENTS

[75] Inventor: Johann Wolf, Scharnstein, Austria

[73] Assignee: Firma Johann Wolf Gesellschaft m.b.H. KG, Scharnstein, Austria

[22] Filed: Jan. 13, 1975

[21] Appl. No.: 540,699

[30] Foreign Application Priority Data

Jan. 21, 1974 Austria ................................ 486/74

[52] U.S. Cl. ................................ 269/59; 269/321 F

[51] Int. Cl.$^2$ ................................ B23Q 3/18

[58] Field of Search ............... 269/321 F, 58, 59, 99

[56] References Cited

UNITED STATES PATENTS

| | | | |
|---|---|---|---|
| 3,057,384 | 10/1962 | Patterson et al. ............... | 269/321 F |
| 3,068,483 | 12/1962 | Moehlenpah et al. ........... | 269/321 F |
| 3,238,867 | 3/1966 | Jureit et al. ...................... | 269/321 F |
| 3,244,091 | 4/1966 | Anderson et al. ............... | 269/321 F |
| 3,319,323 | 4/1967 | Groat .............................. | 269/321 F |
| 3,332,679 | 7/1967 | Jurk ................................. | 269/321 F |
| 3,357,696 | 12/1967 | Mayo et al. ...................... | 269/321 F |

*Primary Examiner*—Al Lawrence Smith
*Assistant Examiner*—Robert C. Watson
*Attorney, Agent, or Firm*—Young & Thompson

[57] ABSTRACT

The parts of each element are fixed in a predetermined configuration to a fixing frame, which together with said parts fixed thereto is pushed into a nailing machine, which is then operated to fix nail plates across joints between adjacent parts of the element. The fixing frame comprises frame members in a configuration which corresponds approximately to the configuration of the element to be manufactured. Said frame members include side members, at least one of which is a longest side member and at least one of which is an opposite side member which is opposite to a longest side member. The fixing frame also comprises fixing means for fixing said parts of said element of construction in said predetermined configuration to said frame. Said fixing means comprise stationary stops provided on said at least one longest side member and quick-clamping devices provided on said at least one opposite side member and including final tightening means.

4 Claims, 4 Drawing Figures

FRAME FOR THE MANUFACTURE OF COMPOSITE WOODEN ELEMENTS

Figure 1:
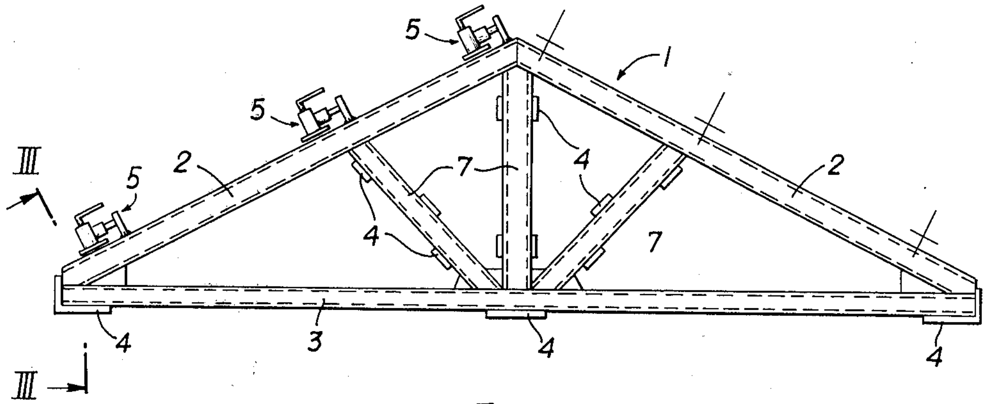

This invention relates to means for manufacturing elements of construction of wood, which comprise parts which are connected at their joints by nail plates in nailing machines, wherein stationary stops and clamping devices are provided for locating the elements of construction.

It is known to join wooden parts in nailing machines by nailing plates to form various elements of construction. The wooden parts are cut to size and are then placed on a slidable deck of the nailing machine and are fixed in the desired configuration by means of adjustable stops and slidable clamping elements. The nail plates are supplied to the beams at their joints. The deck is then pushed under the yoke of the nailing machine and the nail plates are forced into the wood. Other embodiments comprise a stationry deck and a yoke which is movable on wheels over the deck. Instead of a deck, stationary supports for supporting the elements of construction at the joints are also known, which are used in conjunction with a pressure-applying roller, which is movable on wheels and drives the nail plates into the elements of construction. Another known apparatus comprises supports which are slidable along tracks and provided with clamping devices. These arrangements may also comprise a freely movable pressure-applying device for driving the nail plates into the wood. It is also known to provide each of several supports with a pressure-applying means for driving the nail plates into the wood.

The known means have the disadvantage that they must be reset when they are to be used for an element of construction having a different configuration. The stops and clamping devices must be located and fixed in accordance with the desired configuration.

In practice, resetting is often required because identical elements can be nailed in rapid succession. These frequent and time-consuming resetting operations reduce the output and can be performed only by a skilled person. The other operations comprising the placing and fixing of the wooden parts and the nailing can be performed by unskilled labor.

To minimize the resetting times and to eliminate the need for skilled labor, it is proposed according to the invention that at least one flat fixing frame of sectional steel is provided for each configuration in which elements of construction are to be manufactured, which frame has approximately the same configuration as the element of construction to be manufactured and which can be pushed together with the fixed element of construction under the nailing machine, the stationary stops are provided at least on one longest side of the fixing frame, the clamping devices are provided at the opposite side or sides, and the clamping devices consist of quick-clamping devices and are provided with mechanically or hydraulically operable final tightening means. In a preferred embodiment of the invention the clamping devices comprise screws and nuts and each nut is connected to a bushing, which is slidable between two positions along a pivot which extends at right angles to the screw and the arrangement is such that in one position of the bushing the nut and bushing are pivotally movable in unison about the pivot and in the other position of a bushing the nut cooperates with a stop, which prevents a pivotal movement of the nut.

In the construction of halls, of stables in agriculture, of roof structures and of dwelling houses, the elements of construction for use in walls and roofs may be standardized to such a degree that a limited number of types is sufficient. This justifies the provision of an also limited number of fixing frames, each of which is used for manufacturing elements of a given type. These proposed fixing frames have the further advantage that they permit of a better utilization of the nailing machine. If two fixing frames of each configuration are provided, one fixing frame can be loaded and tightened during the time when the second fixing frame has been pushed under the yoke of the nailing machine for a nailing operation.

Figure 2:
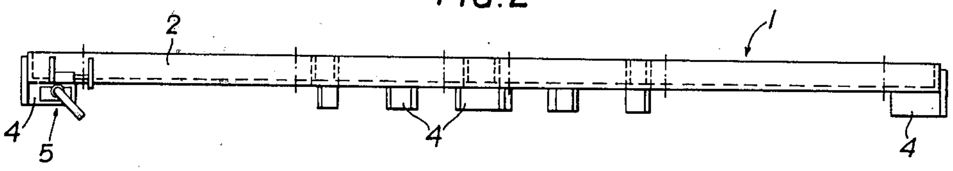
Figure 4:
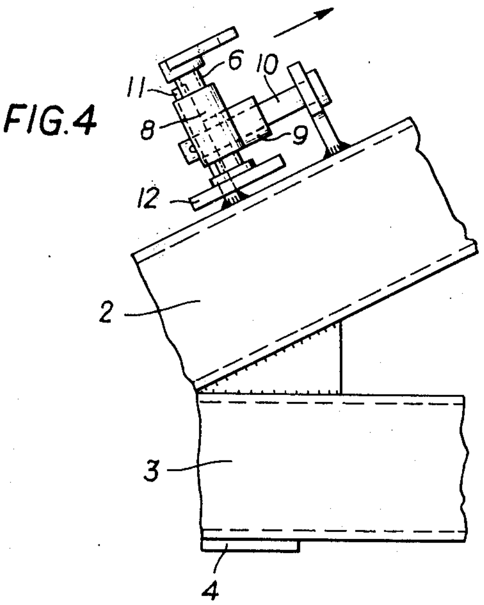
Figure 3:
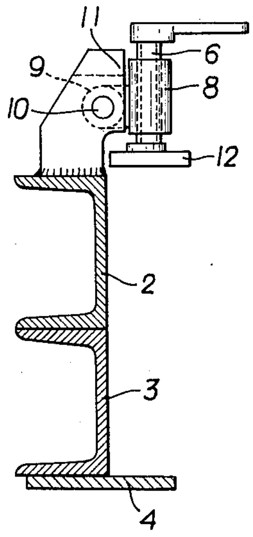

An embodiment of means according to the invention, comprising a fixing frame provided with stationary stops and quick-clamping devices, is shown by way of example on the drawing, in which FIG. 1 is a top plan showing a fixing frame for a roof truss, FIG. 2 a side elevation showing the same frame, FIG. 3 an end view showing a clamping device and FIG. 4 a side elevation thereof.

The proposed fixing frame 1 comprises sectional steel members 2, which are welded together to form a flat frame having the same configuration as the desired element of construction. At least one side member 3 of this frame 1 is provided with strong, stationary stops 4 and at least one opposite side member carries quick-clamping devices 5, which can easily be tightened. Stationary stops 4 are also welded to the braces 7 of the fixing frame. These quick-clamping devices are designed so that they can be pivotally moved to or locked by a locking member approximately in the desired position and are then tightened by means of a screw 6 or hydraulically.

The quick-clamping devices 5 shown in FIGS. 3 and 4 comprise a nut 8, which is threaded on the screw 6 and connected to a bushing 9. The axis of the nut 8 and of the screw 6, on the one hand, and the axis of the bushing 9, on the other hand, cross at right angles. The bushing 9 is slidably mounted on a pivot 10 so that in one position of the bushing, shown on the left in FIG. 4, the nut 8 can be pivotally moved about the pivot 10 to a position in which the quick-clamping device is inoperative. When the bushing is in the position shown on the right in FIG. 4 the nut 8 engages a stop 11, which prevents a pivotal movement of the nut, and the clamping device can now be operated by means of the screw 6 and a clamping plate 12.

The embodiment which is shown and has been described serves only to illustrate the nature of the invention, which is not restricted to details.

What is claimed is:

1. A flat fixing frame for use in the manufacture of composite elements of construction of wood, which elements have a predetermined configuration, in a nailing machine, in which nail plates are fixed across joints between adjacent parts of each element, which frame comprises frame members in a configuration which corresponds approximately to the configuration of the element to be manufactured, said frame members including side members, at least one of which is a longest side member and at least one of which is an opposite side member which is opposite to longest side member, fixing means for fixing said parts of said element of construction in a clamping plane in said predetermined configuration to said frame, said fixing means comprising stationary stops provided on said at least one longest side member and quick-clamping devices provided on said at least one opposite side member and including final tightening means, and means mounting said quick-clamping devices for movement parallel to said at least one opposite side member between a position in which said quick-clamping devices are pivotable out of said clamping plane and a position in which said quick-clamping devices are fixed in said clamping plane.

2. A fixing frame as set forth in claim 1, in which said frame members include members of sectional steel.

3. A fixing frame as set forth in claim 1, in which said quick-clamping devices include mechanically operable final tightening means.

4. A fixing frame as set forth in claim 1, in which each of said quick-clamping devices comprises a screw, a nut threaded on said screw, a pivot having an axis which is at right angles to the axis of said nut, a bushing slidably mounted on said pivot for movement between first and second position and connected to said nut, and a stop arranged to prevent a pivotal movement of said nut about said pivot when said bushing is in said one position, said nut being pivotally movable about said pivot when said bushing is in said second position.

* * * * *